Feb. 1, 1949.   H. P. PHILLIPS   2,460,431
PISTON RING
Filed Jan. 17, 1947
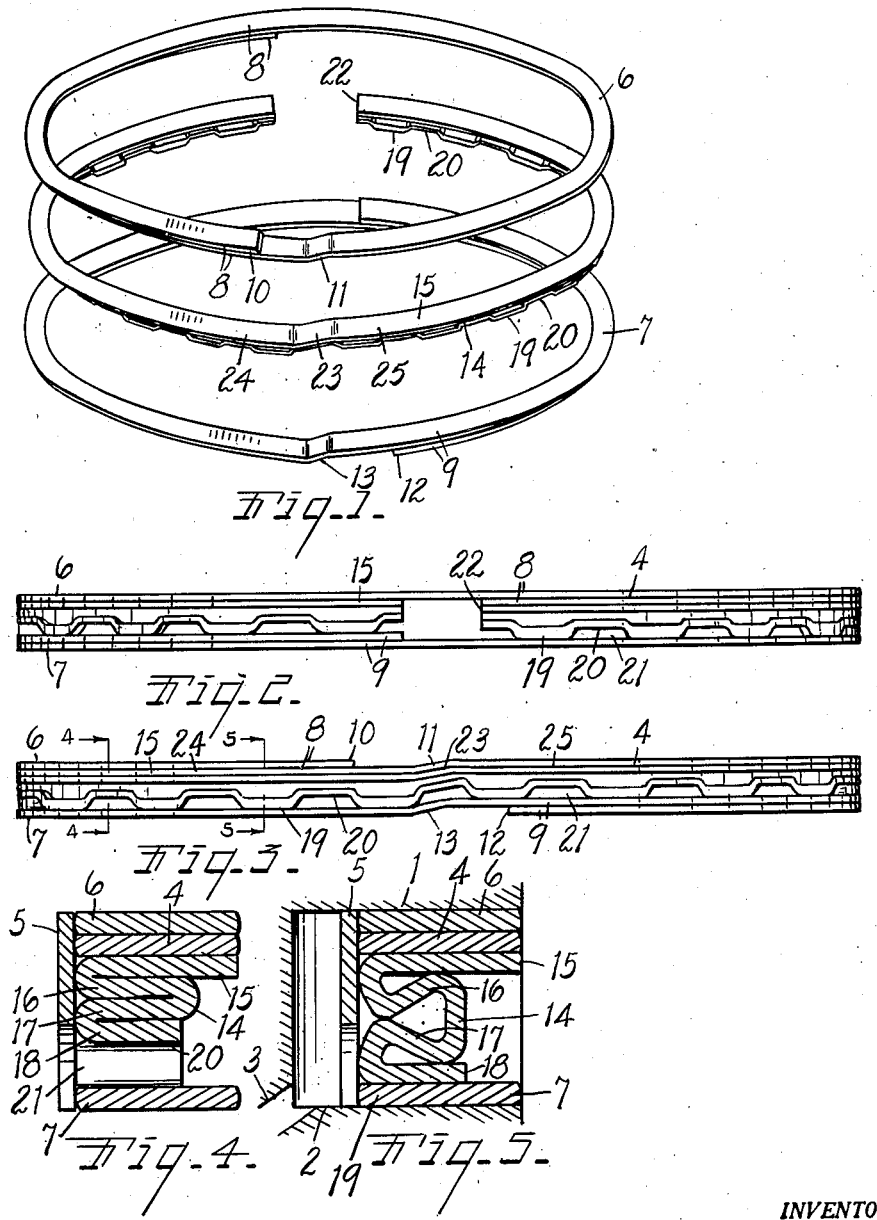
INVENTOR.
Harold P. Phillips
BY
ATTORNEY.

Patented Feb. 1, 1949

2,460,431

UNITED STATES PATENT OFFICE 2,460,431

PISTON RING

Harold P. Phillips, Hastings, Mich., assignor to Hastings Manufacturing Company, Hastings, Mich.

Application January 17, 1947, Serial No. 722,699

10 Claims. (Cl. 309—45)

This invention relates to improvements in piston rings.

The main objects of this invention are:

First, to provide a piston ring assembly which is highly efficient both from the standpoint of effective sealing and also from the standpoint of oil control.

Second, to provide a ring assembly of the type above described in which there is no gap opening, thereby permitting effective sealing and the prevention of "blow-by."

Third, to provide a piston ring assembly which is highly efficient in use, particularly in over-size or rebored or worn cylinders.

Objects relating to details and economies of my invention will appear from the description to follow. The invention is pointed out and defined in the claims.

A preferred embodiment of my invention is illustrated in the accompanying drawing in which:

Fig. 1 is a perspective view of the elements of the assembly in disassembled or separated relation.

Fig. 2 is an edge view of the piston ring assembly showing the relative position of the parts when viewing one side of the assembly.

Fig. 3 is an edge view of the piston ring assembly showing the relative position of the parts when viewing the half of the ring element opposite from that shown in Fig. 2.

Fig. 4 is an enlarged transverse section of the ring assembly on the line 4—4 of Fig. 3, the view also showing in section an expander element.

Fig. 5 is an enlarged fragmentary view showing in section a piston and the ring assembly assembled in the groove of the piston, the ring assembly being shown on the line 5—5 of Fig. 3.

In considering the accompanying drawing, it should be borne in mind that no attempt has been made to show the parts in their relative proportion and where associated with the piston to show the clearances and relative dimensions.

In the embodiment of my invention illustrated, 1 represents the piston in an internal combustion engine. The piston is provided with the groove 2 and the oil drain passage 3 leading from the bottom of the groove and through the piston wall. Disposed in the groove 2 is the piston ring or piston ring assembly designated generally by the reference numeral 4. An expander ring 5 of sinuous form as is common in the art engages the inner side of the ring assembly to force the same into engagement with a cylinder wall, not shown.

My improved ring assembly 4 assembled in the groove 3 comprises a pair of spaced thin steel expansible upper and lower side members 6 and 7 disposed to present their outer edges to a cylinder wall. In practice these members are formed of flat steel stock coiled edgewise. The upper side member or ring element 6 is split and the ends overlap for approximately 180° or one-half a circumference, providing the overlapping portions 8. The lower side member or ring element 7 is also split and the ends overlap approximately 180° or one-half a circumference thereby providing the overlapping end portions 9. These side members 6 and 7 are so formed that when in position in the piston ring groove 2 they are under compression and urged yieldingly outwardly against a cylinder wall.

The upper side member 6 adjacent the free end 10 of the upper overlapping portion 8 is provided with a bent or offset portion 11 extending an axial distance approximately equal to the thickness of the stock of the side member. This permits the lower overlapping end portion 8 to be beneath the general plane of the side member and permits the upper surface of the side member to be substantially all in a plane so as to engage the upper wall of the ring groove 2 throughout substantially the entire circumference thereof. Such engagement is permitted except for the relatively short distance between the end 10 and the offset or bent portion 11, as shown in Figs. 1 and 3, which allows for free expansion and contraction of the side member in the ring groove.

The lower side member 7 adjacent the free end 12 of the lower overlapping portion 9 is provided with a bent or offset portion 13 extending an axial distance approximately equal to the thickness of the stock of the side member. This permits the upper overlapping end portion 9 to be above the general plane of the side member and permits the lower surface of the ring element or side member 7 to be substantially all in a single plane to engage the lower wall of the ring groove 2 throughout substantially the entire circumference of said wall. Such engagement is permitted except for the relatively short distance between the bent or offset portion 13 and the end 12 of the lower overlapping portion 9, which allows free expansion and contraction of the side member in the ring groove.

The side members 6 and 7 are held in spaced relation by the intermediate or spacer member 14. The combined thickness of the side members and the spacer member is such as to properly fit the ring groove 2; that is, it is a reasonably close fit therein and at the same time permits expansive movement without binding. The spacer member 14 is formed of ductile metal folded upon itself into a plurality of integrally connected plies or folds disposed in side by side relation, the upper ply 15 in each of the opposite halves 24 and 25 thereof being flat and the remaining plies 16, 17 and 18 being conformed to provide alternating spacer and drain reaches 19 and 20 respectively. The drain reaches 20 provide passageways 21 through the ring assembly for passage of oil therethrough to the rear of the ring assembly and then to the oil drain openings 3 through the piston wall.

The spacer member 14 has a split or joint 22 with the ends on the opposite sides of the joint spaced as shown in Figs. 1 and 2 and opposite from this split or joint the spacer member is provided with a relatively short bent or offset portion 23 extending axially of the ring assembly to permit the diametrically opposite side portions 24 and 25 of the spacer member on the opposite sides of its offset portion 23 to lie in parallel axially spaced planes. When the spacer member 14 is in assembled relation with the side members 6 and 7 in the ring groove, the lower end portion 8 of the upper side member 1 overlappingly engages the lower portion 24 of the spacer member and the upper end portion 9 of the lower side member 7 overlappingly engages the upper side portion 25 of the spacer member. Also when the side members 6 and 7 and spacer member 14 are in assembled relation in the ring groove 2, their axially bent or offset portions 11, 13 and 23 are in substantially parallel superimposed relation, and the portions 11 and 23 in side abutting relation, as is shown in Fig. 3. This facilitates effective locking of the side members 6 and 7 and spacer member 14 against any appreciable circumferential shifting relative to each other. The spacer member 14 is formed so that when in operative position relative to the piston and cylinder it is under compression and urged yieldingly outwardly by its own tension.

My improved composite piston ring or ring assembly is highly efficient both from the standpoint of oil control and also from the standpoint of sealing or "blow-by" prevention. It is desirable for use in new engines and is especially desirable for use with old or worn cylinders and pistons or rebored or reground cylinders and pistons. It may be very economically produced and readily assembled and when assembled the parts are securely retained against relative circumferential shifting.

I have described and illustrated an embodiment or adaptation of my invention which I find highly satisfactory. I have not attempted to illustrate or describe other embodiments or adaptations that I contemplate as it is believed that this disclosure will enable those skilled in the art to embody or adapt my improvements as may be desired.

Having thus described my invention, what I claim as new and desire to secure by Letters Patent, is:

1. A piston ring assembly comprising split spaced thin expansible side members and a split expansible spacer member intermediate said side members, said side members being disposed to present their outer edges to a cylinder wall and disposed to present their outer side surfaces to the opposite side walls of a piston ring groove, each side member having end portions overlapping approximately one-half the circumference of the side members and having an axially inwardly offset portion disposed at the attached end of one end portion and adjacent the free end of the other end portion, the offset portion in axial extent being approximately equal to the thickness of said adjacent end portion, the offset portion permitting the outer face of the side member to lie substantially entirely in a plane and permitting said face to engage the side wall of a ring groove substantially the entire length of the circumference of said side wall, said offset portion being circumferentially slightly spaced from said adjacent end to permit the side member to expand and contract in a ring groove, said spacer member being formed of ductile metal folded upon itself into a plurality of integrally connected superimposed plies, the bottom wall of the spacer member being upwardly bent at spaced intervals to provide alternate spacer and drain reaches, said spacer member opposite from the split thereof having an axial offset portion to permit the portions on the opposite sides thereof to lie in axially spaced planes, the axially offset portions of the side members and spacer member being in substantially axial superimposed relation to limit relative circumferential shifting of the side members and spacer members when disposed in operative position in a piston ring groove.

2. A piston ring assembly comprising split spaced thin expansible side members and a split expansible spacer member intermediate said side members, said side members being disposed to present their outer edges to a cylinder wall and disposed to present their outer side surfaces to the opposite side walls of a piston ring groove, each side member having end portions overlapping approximately one-half the circumference of the side members and having an axially inwardly offset portion disposed at the attached end of one end portion and adjacent the free end of the other end portion, the offset portion in axial extent being approximately equal to the thickness of said adjacent end portion, the offset portion permitting the outer face of the side member to lie substantially entirely in a plane and permitting said face to engage the side wall of a ring groove substantially the entire length of the circumference of said side wall, said offset portion being circumferentially slightly spaced from said adjacent end to permit the side member to expand and contract in a ring groove, said spacer member opposite from the split thereof having an axial offset portion to permit the portions on the opposite sides thereof to lie in axially spaced planes, the axially offset portions of the side members and spacer member being in substantially axial superimposed relation to limit relative circumferential shifting of the side members and spacer members when disposed in operative position in a piston ring groove.

3. A piston ring assembly comprising split spaced thin expansible side members and a split expansible spacer member intermediate said side members, said side members being disposed to present their outer edges to a cylinder wall and disposed to present their outer side surfaces to the opposite side walls of a piston ring groove, each side member having end portions overlapping approximately one-half the circumference of the side members and having an axially inwardly offset portion disposed at the attached end of one end portion and adjacent the free end of the other end portion, the offset portion in axial extent being approximately equal to the thickness of said adjacent end portion, the offset portion permitting the outer face of the side member to lie substantially entirely in a plane and permitting said face to engage the side wall of a ring groove substantially the entire length of the circumference of said side wall, said offset portion being circumferentially slightly spaced from said adjacent end to permit the side member to expand and contract in a ring groove, said spacer member being formed of ductile metal folded upon itself into a plurality of integrally connected superimposed plies, said spacer member opposite from the split thereof having an axial offset portion to permit the portions on the opposite sides thereof to lie in axially spaced planes, the axially offset portions of the side members and spacer member being in substantially axial superimposed relation to limit relative circumferential shifting of the side members and spacer members when disposed in operative position in a piston ring groove.

4. A piston ring assembly comprising split spaced thin expansible side members and a split expansible spacer member intermediate said side members, each side member having superimposed end portions overlapping each other approximately 180° and each having an axially inwardly offset portion disposed at the attached end of one end portion and adjacent the free end of its other end portion, the axial dimension of the offset portion being substantially equal to the axial thickness of the stock of the side member, said offset portion being slightly circumferentially spaced from said free end to permit the side member to expand and contract in a ring groove, said spacer member having oil drain passageways therethrough and having an axial offset portion to permit the portions of the spacer member on the opposite sides of the said offset portion to lie in axially spaced planes, the offset portions of the side members and the spacer member being disposed in superimposed relation.

5. A piston ring assembly comprising split spaced thin expansible side members and a split expansible spacer member intermediate said side members, each side member having superimposed end portions overlapping each other approximately 180° and each having an axially inwardly offset portion disposed at the attached end of one end portion and adjacent the free end of its other end portion, the axial dimension of the offset portion being substantially equal to the axial thickness of the stock of the side member, said offset portion being slightly circumferentially spaced from said free end to permit the side member to expand and contract in a ring groove, said spacer member having an axial offset portion to permit the portions of the spacer member on the opposite sides of the said offset portion to lie in axially spaced planes, the offset portions of the side members and the spacer member being disposed in superimposed relation.

6. A piston ring assembly comprising thin split expansible spaced upper and lower side members and a split expansible spacer member intermediate said side members, the side members being disposed to present their edge portions to a cylinder wall and their outer surfaces being disposed in planes for engagement with the upper and lower walls of a ring groove throughout substantially the entire circumference of the ring groove, each side member having superimposed end portions overlapping each other for approximately one-half a circumference, the axially inner superimposed end portions of each side member being connected to the body of the ring by a relatively short axial offset portion to permit said end portion to be disposed axially within the plane of the side member, said spacer member having an axially offset portion opposite the split thereof to permit the sides of the spacer member on the opposite ends of the axially offset portion thereof to be in different planes, the axial offset portions of the side members and spacer member being disposed in substantially parallel superimposed relation.

7. In a piston ring assembly, a relatively thin split expansible side member for engaging one of the side walls of a piston ring groove, said side member being disposed to present an outer edge portion to a cylinder wall, said side member being formed to lie in a plane for approximately 360° and having an axially inwardly offset end portion overlapping the opposite end portion for approximately 180° and lying in a plane parallel to the first named plane of the side member, said first named end portion being connected to the side member by an axially extending portion slightly circumferentially spaced from the opposite free end of the side member to permit expansion and contraction of the side member in a piston ring groove.

8. In a piston ring assembly, a split expansible spacer member for disposition between spaced split expansible side members, the ends of said spacer member being circumferentially separated by an open space to permit expansion and contraction of the spacer member in a ring groove, the spacer member opposite the split thereof having an axially offset portion to permit the portions of the spacer member on the opposite sides of said offset portion to lie in axially spaced planes, the portion of the spacer member on one side of said axially offset portion being axially offset throughout substantially its entire length relative the portion of the spacer member on the opposite side of said axially offset portion.

9. In a piston ring assembly, split expansible relatively thin side members and a spacer member disposed intermediate said side members, said side members being disposed to present their edge portions to a cylinder wall, each side member being disposed to lie in a plane to engage a side wall of a ring groove throughout substantially the entire circumference thereof, each side member having an end portion overlapping its opposite end portion and lying in a plane axially inwardly offset from said plane of the side member, said axially inwardly offset end portion being connected to the side member by an axially offset portion, said spacer member having an axially offset portion to permit the side portions of the spacer member on the opposite sides of its axially offset portion to lie in axially spaced planes, the portion of the spacer member on one side of said axially offset portion being axially offset throughout substantially its entire length relative the portion of the spacer member on the opposite side of said axially offset portion, the axially offset portions of the side members and spacer member being in substantially axial superimposed relation, the overlapping end portions of one side member overlapping one of said axially offset side portions of the spacer member and the overlapping end portions of the other side member overlapping the other axially offset side portion of the spacer member.

10. In a piston ring assembly, split expansible side members and a split expansible spacer member disposed between said side members, said side members having superimposed overlapping end portions, the overlapping end portions of one side member being disposed radially on the opposite side of the ring assembly from that of the overlapping end portions of the other side member, said spacer member having an axially offset portion substantially spaced from the split thereof to permit the side portions of the spacer member on the opposite sides of the axially offset portion thereof to lie in axially spaced planes, the portion of the spacer member on one side of said axially off set portion being axially off set throughout substantially its entire length relative the portion of the spacer member on the opposite side of said axially offset portion, one of said side portions of the spacer member overlappingly engaging the axially inner end portion of one side member, and the other of said side portions of the spacer member overlappingly engaging the axially inner end portion of the other side member.

HAROLD P. PHILLIPS.

REFERENCES CITED

The following references are of record in the file of this patent:

UNITED STATES PATENTS

| Number | Name | Date |
|---|---|---|
| 2,357,467 | Guelker | Sept. 5, 1944 |
| 2,404,862 | Phillips | July 30, 1946 |